United States Patent [19]

Scott

[11] 4,386,487
[45] Jun. 7, 1983

[54] LOW TORSION MOUNTING CONSTRUCTION

[75] Inventor: Peder W. Scott, Manchester, Conn.

[73] Assignee: United Technologies Corporation, Hartford, Conn.

[21] Appl. No.: 271,331

[22] Filed: Jun. 8, 1981

[51] Int. Cl.³ .......................... E04F 11/00; E06C 9/00; E06C 9/08
[52] U.S. Cl. ....................................... 52/184; 52/182; 182/93
[58] Field of Search ........................... 52/184, 182, 20; 182/90–99, 85, 82, 178, 129, 229

[56] References Cited

U.S. PATENT DOCUMENTS 1,820,289  8/1931  Rawson ................................. 182/93
3,618,702  11/1971  Hendrix, Jr. ......................... 182/178

Primary Examiner—Alfred C. Perham
Assistant Examiner—Eugene R. Washington
Attorney, Agent, or Firm—John Swiatocha

[57] ABSTRACT

A segmented apparatus is mounted to a tower or other vertically extending structure on a plurality of spaced supporting members such as I-beams or the like. Each apparatus segments is mounted on a pair of supporting members such that the weight of the segment loads the supporting members either through or proximal to the shear center thereof for minimization of supporting member torsional loading.

8 Claims, 5 Drawing Figures

LOW TORSION MOUNTING CONSTRUCTION

DESCRIPTION

1. Technical Field

This invention relates to a mounting construction for ladders, cable guides and the like, which are mounted to the interior of a tower such as that employed in a large wind turbine.

2. Background Art

Modern, large wind turbines are most often supported on tall (200 to 300 ft.) towers which are capable of flexing under certain wind-gusting conditions. Such towers require ladders to provide access to the wind turbine from the ground by operating personnel and cable trays or guides which maintain the alignment of electric power transmission lines extending the length of the tower. To accommodate such flexure of the tower, the ladders and the cable trays are segmented, each segment being in the neighborhood of 20 feet long and capable of relative movement with respect to the other segments so as not to deform or offer any resistance to the tower flexure.

In state of the art tower design, it has been the practice to mount such ladder or cable tray segments to supporting members such as structural I-beams or the like, which are themselves supported by the tower walls. While such structural beams exhibit satisfactory strength in tension, compression, and bending, these beams are relatively weak in axial torsion. To prevent beam failure such as plastic deformation or the like, the present invention provides a means for mounting segmented apparatus such as the aforementioned ladders and cable trays to such structural beams with a minimum amount of torsional beam loading.

DISCLOSURE OF INVENTION

It is, therefore, a principal object of the present invention to provide a low torsion mounting construction for mounting apparatus such as ladders and the like to structures such as towers or buildings.

It is another object of the present invention to provide such a construction suitable for mounting such an apparatus of segmented structure.

In accordance with the present invention, a segmented apparatus such as a ladder or a cable guide or tray is mounted to a tower or other vertical structure on a plurality of spaced, supporting members such as I-beams or the like, each segment being mounted on a pair of supporting members such that each supporting member serves as a mount for adjacent ends of two adjacent segments. The supporting members are loaded by the segments proximally to or through the beams' shear centers whereby torsional loading of the members is minimized. In the preferred embodiment, the segments are cantilevered from the supporting members such that for each segment, one end thereof is mounted to a bracket proximal to the shear center of one supporting member and the second end of the segment is mounted to an adjacent supporting member which offers only one dimensional restraint of the segment, the reaction force on the adjacent supporting member being in line with the shear center thereof.

BEST MODE OF CARRYING OUT THE INVENTION

Figure 1:
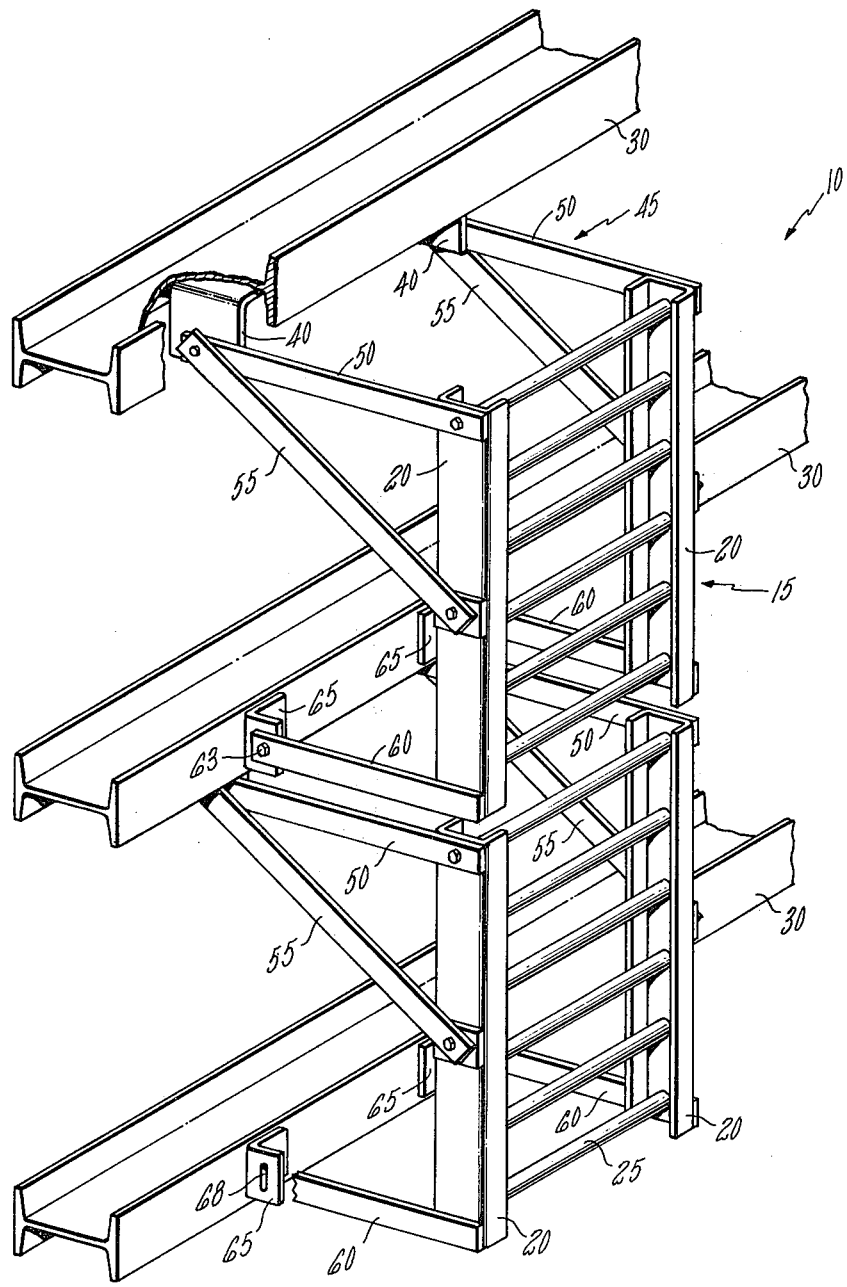
FIG. 1 is a fragmentary, perspective view of the low torsion mounting construction of the present invention as employed with a segmented ladder, a portion of the construction being broken away to show details of construction.

Referring to FIG. 1 the construction of the present invention is shown generally at 10 and as illustrated, is employed in the mounting of a segmented ladder comprising a plurality of individual segments 15 each comprising a pair of side rails 20 with spaced rungs 25 fixed therebetween in any suitable manner.

The mounting construction itself comprises a plurality of spaced supporting members such as horizontally extending, vertically spaced beams 30, in this embodiment, each of the beams being of standard I-shape, including a medial web portion with perpendicular flanges formed in the sides thereof. The beams are fixed to and supported by the tower, building or other structure to which the ladder is to be mounted in any suitable manner, such as by a number of vertical beams, (not shown).

Each of the ladder segments is attached to a pair of adjacent beams whereby each beam serves as a mount for adjacent ends of two adjacent ladder segments. The upper end of each ladder segment is connected to brackets 40 fixed to the web of the corresponding beam by welding, riveting, bolting or the like. The connection between the upper ladder segment and bracket 40 is made by braces 45, each comprising a pair of elongate members 50 and 55 fixed to the ladder segment at spaced locations thereon, and to bracket 40 at a single location. It is noted that the connections of the first brace 45 to beams 30 are made proximally to the shear center of the beam, in this case, along the beam's central longitudinal axis. While the first brace 45 is shown consisting of a pair of members in a bolted truss configuration, it will be understood that an equivalent brace such as a single member welded to the ladder side rails may be employed with equal utility.

The lower or second end of each ladder segment is provided with a second brace 60 comprising a single elongate member fixed to the ladder end such as by welding, and bolted or riveted at 63 to a second mounting bracket 65 which is fixed to the beam flange closest to the ladder segments by any suitable means such as welding, brazing, bolting or the like. As best seen in the illustrations of the lowermost beam in FIGS. 1 and 2, second mounting bracket 65 includes a vertical slot 68 therein which mates with a horizontally aligned aperture in brace 60, the slot and the aperture receiving the bolt or rivet 63, whereby the beam only retains the lower segment end horizontally, offering no resistance to vertical loading by the ladder segment.

Figure 2:
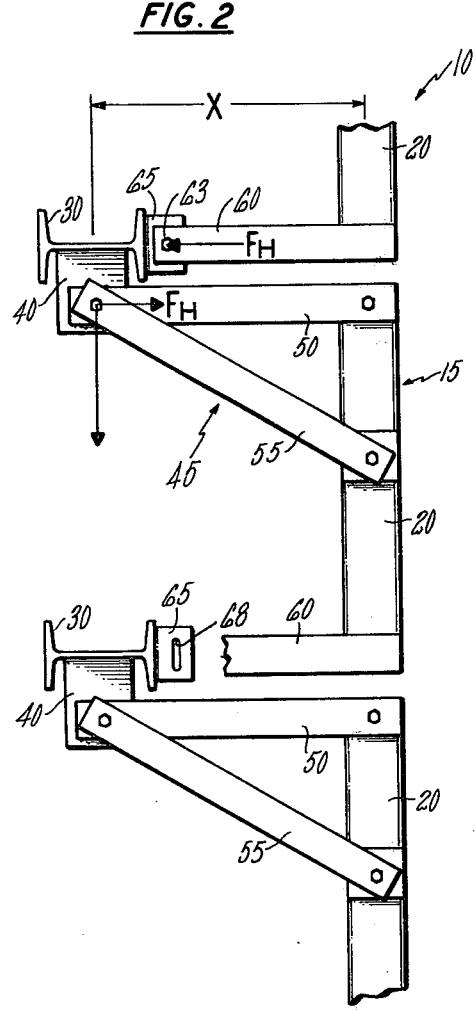
FIG. 2 is a side view of the construction shown in FIG. 1.

The loading of the supporting beams is diagrammatically shown in FIG. 2. For each of the beams 30, the loading includes a vertical force component $F_V$ applied to the beam at first mounting bracket 40, a horizontal force component $F_H$ applied to the beam at the same location, and an equal and opposite horizontal force $F_H$ applied to the beam at the flange thereof through bracket 65. As is set forth hereinabove, while structural beams such as those shown at 30 exhibit great strength in tension, compression, and bending, such beams are relatively weak in torsion about the shear center thereof. However, by the present invention, the torsional loading about the shear center is minimized. As shown in FIG. 2, considering first the forces applied to bracket 40, it is seen that the vertical component $F_V$ acts through the shear center of the beam and therefore contributes nothing toward the torsionally loading thereof. Likewise, the horizontal component $F_H$ from the lower end of an attached ladder segment also acts through the shear center of beam 30, thereby also failing to contribute toward the torsional loading of the beam. Accordingly, it is seen the only torsional loading of the beam is the result of the horizontal component acting at bracket 40. A free body analysis of the construction illustrated shows that $F_H$ is equal to the weight of the ladder multiplied by X, the distance of the ladder segment from bracket 40 and divided by the length of each segment. Typically, dimension X will be on the order of 18 inches while the length of each segment is on the order of 20 feet. Accordingly, it is seen that $F_H$ is a small fraction of the weight of each segment. It will also be appreciated that this relatively small horizontal force component is applied quite close to the shear center of beam 30 (in the neighborhood of 4 inches therefrom). Thus the loading on beam 30 is the product of a relatively small force applied to the beam at a relatively insignificant distance from the shear center thereof whereby the torsional loading of the beams is minimized.

Figure 3:
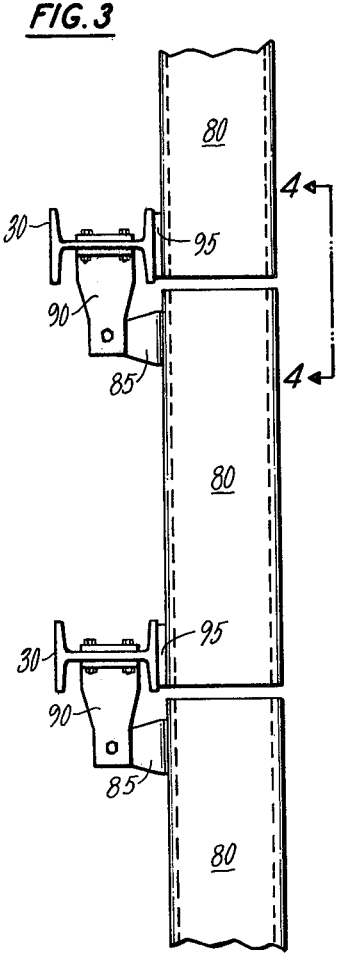
FIG. 3 is a side view of an alternate embodiment of the present invention wherein the low torsion mounting construction of the present invention is employed with a segmented cable guide.
Figure 4:
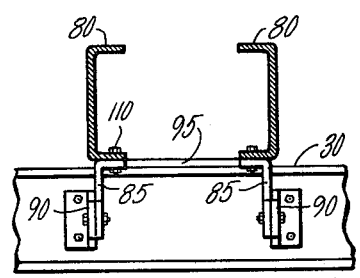
FIG. 4 is a frontal elevation as viewed in the direction of line 4—4 of FIG. 3, portions of FIG. 4 being broken away to show details of construction.
Figure 5:
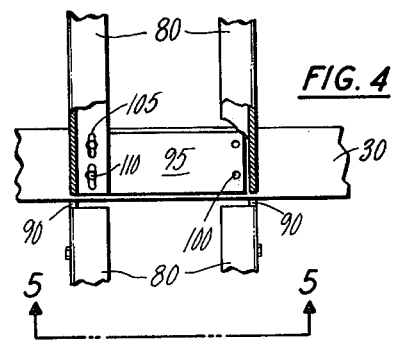
FIG. 5 is a bottom view of the apparatus shown in FIG. 4 taken in the direction of line 5—5 thereof.

Referring to FIGS. 3, 4, and 5, an alternate embodiment of the present invention is shown wherein the low torsion mounting construction of the present invention is employed in mounting a pair of channel shaped cable guides or trays to the tower. The cable trays are segmented, each segment 80 having a first brace 85 fixed thereto by welding or equivalent means. Brace 85 is attached to first mounting bracket 90 secured to the web portion of supporting beams 30 as by riveting, welding, or bolting.

The flange of beam 30 closest to the cable trays includes a fixture 95 secured thereto as by welding, the fixture being provided with apertures 100 in horizontal alignment with the centers of vertical slots 105 provided in cable tray segment 80. Aperture 100 and slot 105 receive a pin or bolt 110 therethrough, whereby the cable tray is retained at the lower end thereof by beam 30 in only a horizontal direction, the slot in the cable tray offering no resistance to vertical loading.

It will be readily understood that the loading of beams 30 in FIG. 3 is substantially the same as that shown in FIG. 2. As set forth hereinabove, due to the slotted connection of fixture 95 and cable tray segment 80, only horizontal loading from the lower portion of the cable tray is applied to beam 30. This loading is applied through the shear center of the beam and therefore contributes nothing to torsional loading. Likewise, vertical loading of the beam from the connection of bracket 90 with the upper end of the cable tray is also through the shear center of the beam and therefore contributes nothing to the torsional beam loading. Thus, it is seen that as in the first embodiment, the only loading contributing to torsional loading is the horizontal loading acting on the beam through bracket 90. As demonstrated above with respect to the first embodiment, this loading is merely a small fraction of the total weight of the cable tray assembly, and acts only a slight distance from the beams's shear center, thereby contributing negligibly to the torsional loading of the beam.

Having thus described the invention, what is claimed is:

1. A low torsion mounting construction for mounting a plurality of segments of a segmented apparatus to a structure, said construction being characterized by:
  (a) a plurality of spaced support members;
  (b) first mounting means disposed on said support members proximally to the shear centers thereof, a first end of each of said segments being connected to said first mounting means for both horizontal and vertical retention of first said segment end by a corresponding one of said support members, vertical loading of said corresponding support member due to the weight of said segment being applied to said corresponding support member through the shear center thereof; and
  (c) second mounting means each disposed on one of said support members adjacent a second end of said segments, said second mounting means being in horizontal alignment with the shear center of said adjacent support member and connected to said second segment end for horizontal retention only of said second segment end by said adjacent support member, horizontal loading of said adjacent support member due to the weight of said segment being applied to said adjacent support member through the shear center thereof.

2. The construction of claim 1 further characterized by said second end of each of said segments and said first end of the segment adjacent thereto being connected to a common support member.

3. The construction of claim 1 further characterized by said support members comprising structural beams.

4. The construction of claim 1 further characterized by said first mounting means comprising a first mounting bracket, said first end of each of said segments including a first brace fixed thereto, said brace being connected to said first mounting bracket.

5. The construction of claim 1 further characterized by said second mounting means comprising a second mounting bracket, said second end of each of said segments including a second brace fixed thereto, one of said second brace and said second mounting bracket including a vertically extending slot, the other including an aperture in horizontal alignment with said slot, said aperture and slot receiving a fastener therethrough for connecting said second brace to said second mounting bracket.

6. The construction of claim 4 further characterized by each of said segments comprising a ladder section including a pair of spaced side rails having a plurality of rungs fixed therebetween, said first brace comprising first and second elongate members fixed at first ends thereof to said side rails at longitudinally spaced locations thereon and at second ends thereof to said first mounting bracket at a single location thereon.

7. The structure of claim 4 further characterized by each of said support members comprising a beam including a flange at a portion thereof adjacent one of said segment, said second mounting means comprising a mounting fixture fixed to said flange, one of said mounting fixture and an adjacent segment including a vertically extending slot, the other including an aperture in horizontal alignment with said slot, said aperture and said slot receiving a fastener therethrough for connecting said second segment end to said beam at said fixture.

8. The structure of claim 7 wherein each of said segments comprises an elongate channel member.

* * * * *

UNITED STATES PATENT AND TRADEMARK OFFICE
CERTIFICATE OF CORRECTION

PATENT NO. : 4,386,487
DATED : June 7, 1983
INVENTOR(S) : Peder W. Scott

It is certified that error appears in the above-identified patent and that said Letters Patent is hereby corrected as shown below:

Column 4, line 18, "first said" should be --said first--.

Column 4, line 28, cancel "adjacent".

Column 4, line 30, cancel "adjacent".

Column 4, line 31, cancel "adjacent".

Column 4, line 33, cancel "adjacent".

Signed and Sealed this

Sixteenth Day of July 1985

[SEAL]

Attest:

DONALD J. QUIGG

Attesting Officer   Acting Commissioner of Patents and Trademarks